Figure 1:
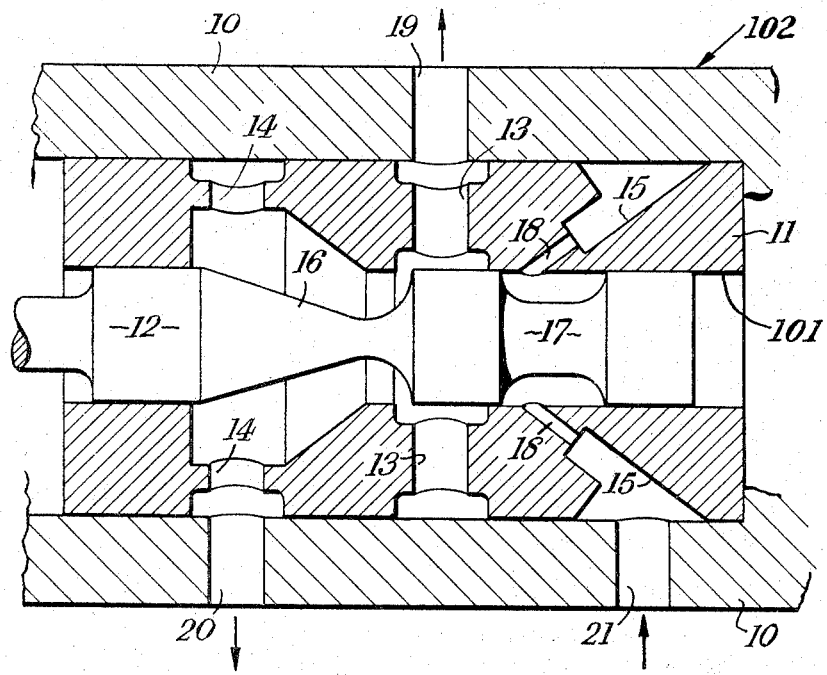

United States Patent Office 3,323,549
Patented June 6, 1967

3,323,549
HYDRAULIC VALVES
James Edward Carrington, Cavehill, Belfast, Northern Ireland, assignor to Short Brothers & Harland Limited, Belfast, Northern Ireland, a British company
Filed May 14, 1964, Ser. No. 367,504
Claims priority, application Great Britain, May 16, 1963, 19,550/63
6 Claims. (Cl. 137—625.69)

The present invention relates to hydraulic valves and is particularly, though not exclusively, concerned with a hydraulic pilot valve for use in controlling large capacity hydraulic control valves for machines such as a forging press, the press unloading valve being one such control valve.

It is known that the accuracy with which a forging press can be operated and the rate of forging are governed not only by the response time of the control system but also by the flow capacity of the pilot valve controlling the main press unloading valve, and it is an object of the present invention to provide a pilot valve which has improved flow capacity and response time.

When hydraulic fluid is passed through a conventional spool valve, a flow reaction force proportional to the flow rate is generated in the valve urging it to close. Where the valve is controlled by an electro-mechanical transducer for example, the driving force available to open the valve is usually small, and the reaction force referred to above results in a limitation to the flow capacity of the valve.

In order to offset or compensate for the fluid flow reaction force, valves have been proposed in which the spool or, alternatively both spool and sleeve of the valve, are so shaped as to develop a force on the spool which assists the opening of the valve. In one well known arrangement, the valve spool is of waisted form between an inlet port and an outlet port of the valve, the waisted portion being generally frusto-conical and increasing in cross-section to the outlet port. In addition the sleeve bore may be recessed. The effect of this is to partially eliminate, eliminate, or over-compensate for the fluid flow reaction force generated as a result of flow of fluid from the inlet to the outlet.

If a 3-way valve is to be employed as the pilot valve in the above application, an inlet port is provided for the supply of fluid to the valve, a fluid return port is provided for the return of fluid to the fluid reservoir tank and an actuator port is provided for the flow of fluid to and from the main valve (e.g. unloading valve). The compensation referred to above can, however, only be applied in the actuator to tank flow direction on such a 3-way valve and proposals have therefore been made to achieve the same compensation when the fluid flow direction is from the supply inlet port to the actuator by providing a 3-way valve with four ports in which fluid is fed from a supply inlet port to an actuator outlet port through a path including an appropriately waisted portion on the spool and from an actuator inlet port to a tank outlet port through a path including a further appropriately waisted portion on the spool. This modification, however, adds to the complexity of the control valve by requiring two separate actuator ports and it is an object of the present invention to provide a 3-way valve which is partially compensated, compensated, or over-compensated in each of its two flow directions and has only three ports.

According to the present invention, there is provided a 3-way hydraulic control valve including a spool having a waisted portion arranged to partially compensate, compensate or over-compensate for the flow reaction force resulting from the flow of fluid from an actuator port to a tank outlet port, and further including a fluid inlet port arranged to direct fluid at an angle to the translational axis of the spool so as to apply an axial impulsive force in a sense such as to assist the opening movement of the valve spool permitting the flow of fluid from the supply inlet to the actuator port, the magnitude of said impulsive force being such as to partially compensate, compensate or over-compensate for the reaction force developed as a result of the latter fluid flow. The body portion or sleeve of the valve may, if required, be recessed in the bore thereof.

Figure 2:
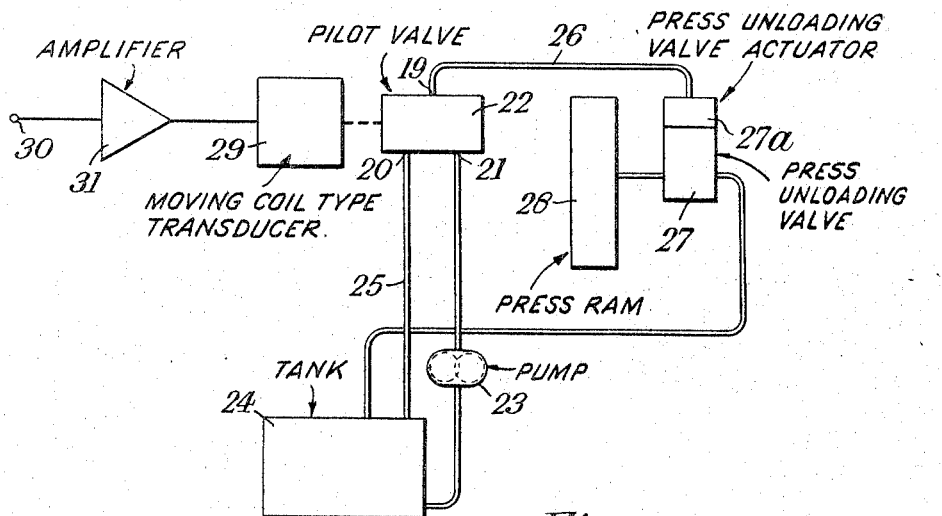

One embodiment of the invention will now be described by way of example with reference to the accompanying drawings, in which:

FIG. 1 is a schematic cross-sectional elevation of a 3-way valve constructed in accordance with the invention, and, FIG. 2 is a schematic block diagram of a pilot valve control arrangement for an unloading valve of a press ram.

Referring first to FIG. 1 of the drawings, the 3-way valve comprises a valve body 102 including a housing portion 10, a valve sleeve 11 and an axially displaceable valve spool 12 which is arranged in a bore 101 of the sleeve 11 and which is adapted to be operated by an electro-mechanical transducer (not shown). The sleeve 11 includes actuator ports 13, tank or outlet ports 14 and fluid supply inlet ports 15, these ports being spaced along the valve sleeve with the actuator ports being positioned between the inlet and outlet ports. The actuator, outlet and inlet ports respectively comprise a plurality of identical ports arranged in spaced relation around the sleeve of the valve. The spool 12 is formed with a waisted frustoconical portion 16 which, in known manner, serves to compensate, partially compensate or over-compensate for the reaction force produced as a result of the flow of fluid from the actuator ports 13 to the tank ports 14. The spool 12 is provided with a further reduced or waisted section 17 and the fluid supply ports 15 are as shown directed at an angle to the translational spool axis so that fluid impinges on a shoulder of the spool 12 formed by the termination of waisted section 17 and produces an axial impulsive force thereon tending to partially compensate, compensate or over-compensate for the reaction force set up by the fluid flow from the ports 15 to the actuator ports 13. The supply ports 15 are provided with reduced portions 18 adjacent to the spool, which serve to increase the velocity of flow of fluid to the valve to provide the required axial impulsive force. The sleeve 11 is mounted in the housing 10 which is provided with actuator, outlet and inlet ducts, 19, 20 and 21 respectively, which in turn communicate with the ports 13, 14 and 15.

The valve shown in FIG. 1 may with advantage be employed as a pilot valve in a control arrangement for the press unloading valve of a large hydraulically operated machine such as a forging press. As shown in FIG. 2 a pilot valve 22 of the same construction as that illustrated in FIG. 1 is supplied with fluid under pressure from a pump 23 fed from a tank 24 and fluid is returned to the tank 24 via a fluid return pipe 25. The actuator port 19 of valve 22 is connected via pipe 26 to the press unloading valve actuator 27a, the flow of fluid to or from this actuator controlling the main press unloading valve 27.

The valve 22 is operated by a transducer 29 of the moving coil type, to which electric operating signals are applied from an input terminal 30 after amplification by an amplifier 31.

What I claim as my invention and desire to secure by Letters Patent is:

1. A three-way hydraulic control valve including a valve body and a spool longitudinally slidable within a bore in the valve body, said valve body having an actuator port, a fluid outlet port and a fluid inlet port spaced along the valve body with the actuator port positioned between the inlet and outlet ports, said spool having a waisted portion which increases in cross section from the region of the actuator port to the outlet port to partially compensate, compensate or over compensate for the flow reaction force resulting from the flow of fluid from the actuator port to the fluid outlet port through said waisted portion in a first position of the spool, said fluid supply inlet port being inclined toward the translational spool axis in the direction of the actuator port, and said spool having a further waisted portion so disposed that fluid from the fluid inlet port impinges on a shoulder of the spool formed by the termination of said further waisted portion to apply an axial impulsive force on said spool in the direction of the actuator port to partially compensate, compensate or over compensate for the reaction force developed as a result of the flow of fluid from the supply inlet port to the actuator port through said further waisted portion in a second position of the spool.

2. A valve according to claim 1, wherein the waisted portion of the spool is generally frusto-conical and the valve body is recessed in the bore adjacent to the waisted portion of the spool.

3. A valve according to claim 1, wherein said inlet port is of reduced section at the end thereof adjacent the spool.

4. A valve according to claim 1, wherein said inlet port is one of a plurality of identical inlet ports arranged in spaced relation around the valve body and communicating with an inlet duct in said valve body.

5. A valve according to claim 1, wherein said actuator port is one of a plurality of identical actuator ports arranged in spaced relation around the valve body and communicating with an actuator duct in said valve body.

6. A valve according to claim 1, wherein the outlet port is one of a plurality of identical outlet ports arranged in spaced relation around the valve body and communicating with an outlet duct in said valve body.

References Cited
UNITED STATES PATENTS

| | | | |
|---|---|---|---|
| 1,343,024 | 6/1920 | Bark | 251—282 |
| 2,415,417 | 2/1947 | Collins et al. | 137—625.69 |
| 2,661,182 | 12/1953 | Kipp | 137—625.69 |
| 2,882,867 | 4/1959 | Thompson | 137—625.48 X |
| 2,987,050 | 6/1961 | Oppenheimer et al. | 137—625.69 X |
| 3,038,497 | 6/1962 | Morrison | 137—596 X |

M. CARY NELSON, *Primary Examiner.*

HENRY KLINKSIEK, *Examiner.*